Dec. 25, 1956  E. R. ANDERSON  2,775,278
PEACH PITTER
Filed Sept. 1, 1951  4 Sheets-Sheet 2
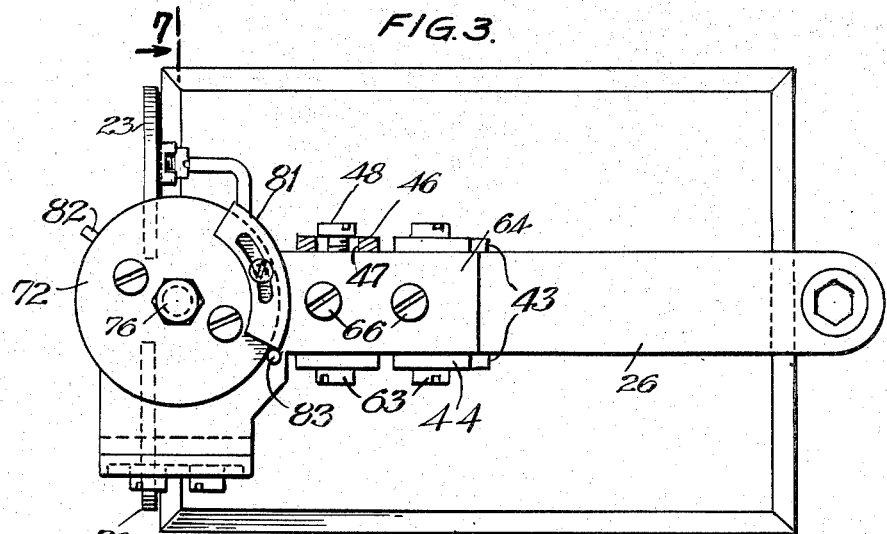
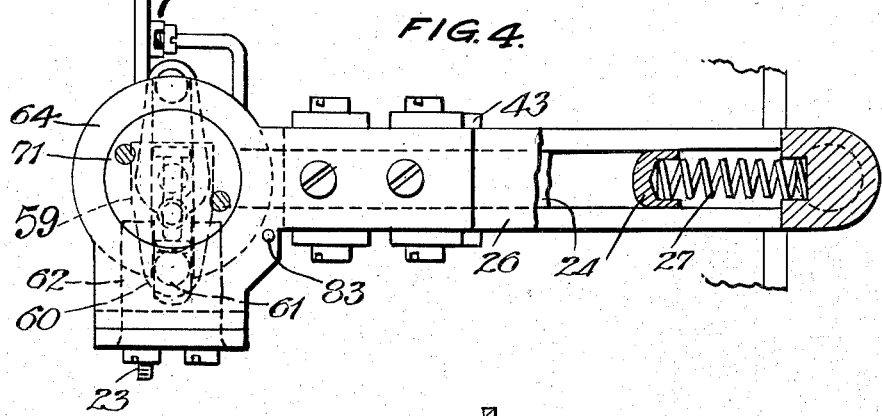
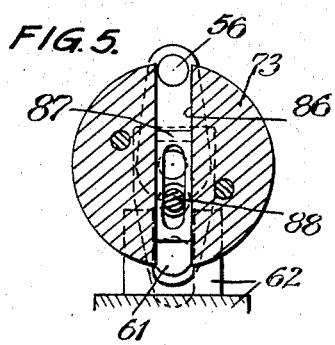
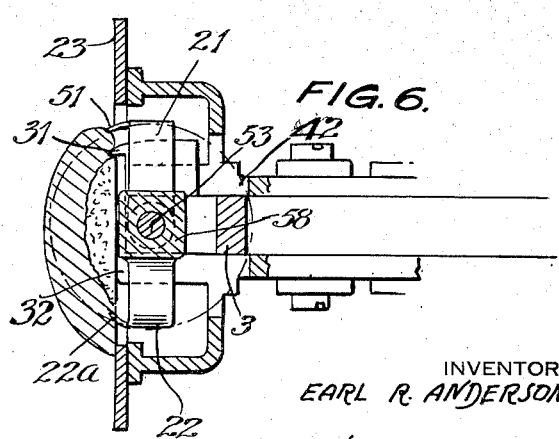
INVENTOR.
EARL R. ANDERSON
BY Harper Allen
ATTORNEY.

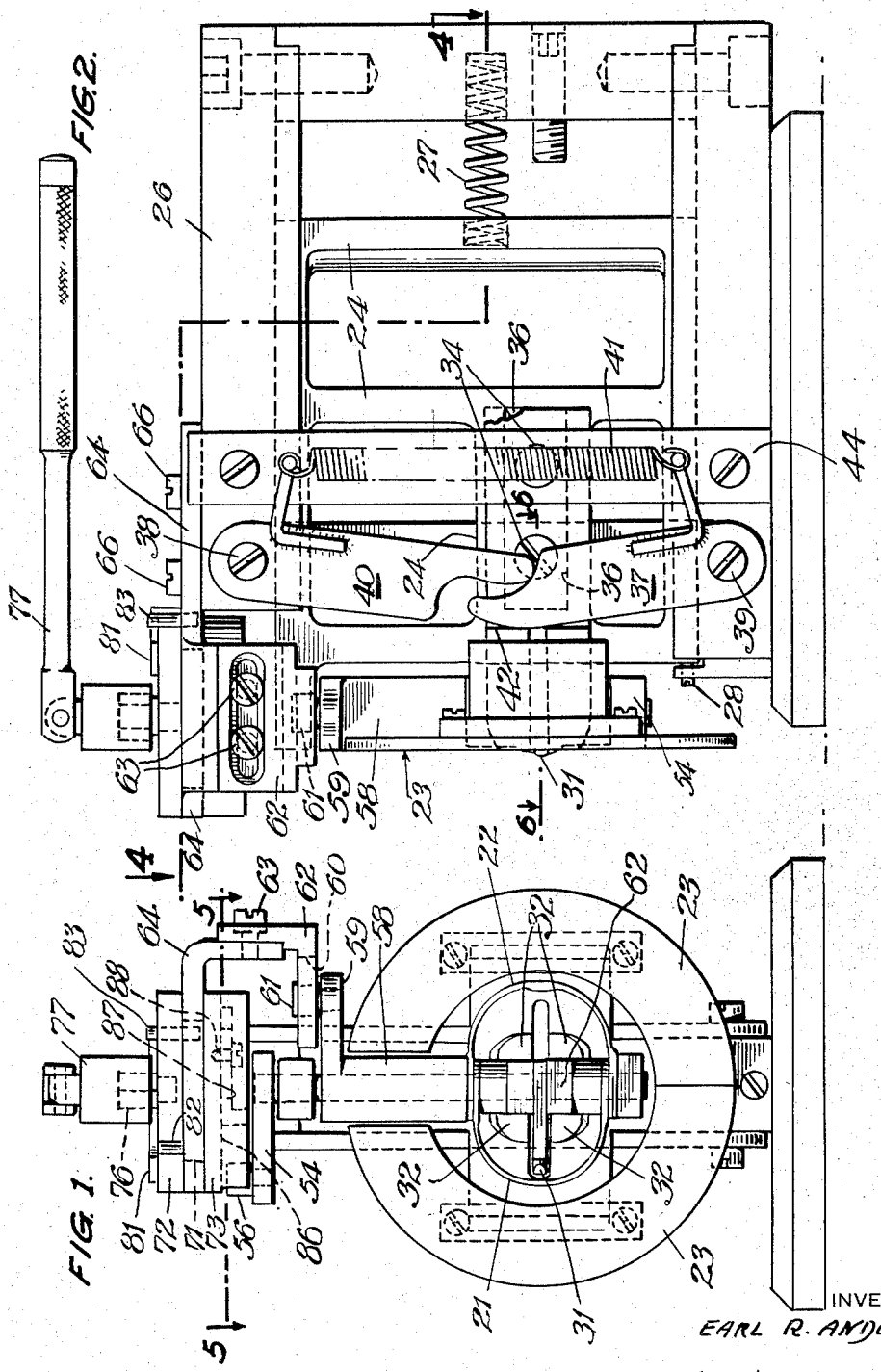

Dec. 25, 1956  E. R. ANDERSON  2,775,278
PEACH PITTER
Filed Sept. 1, 1951  4 Sheets-Sheet 3
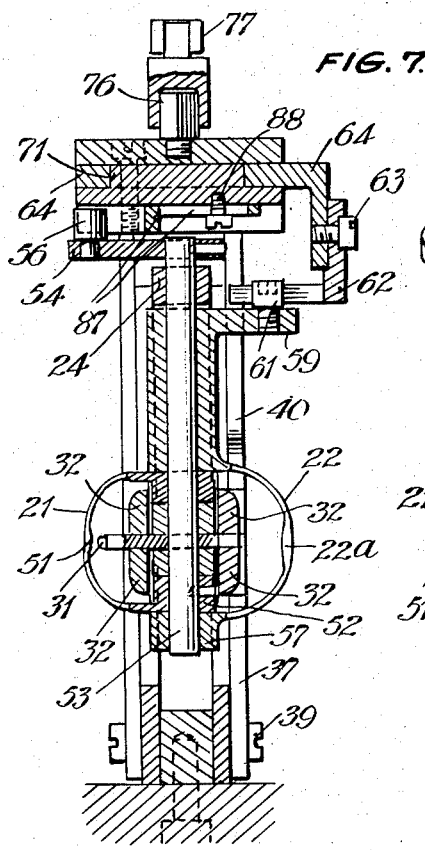
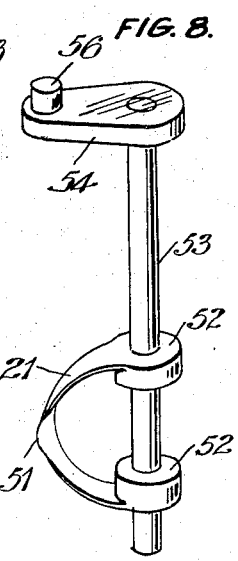
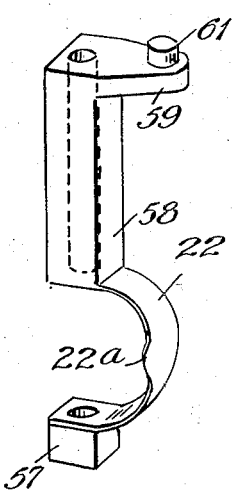
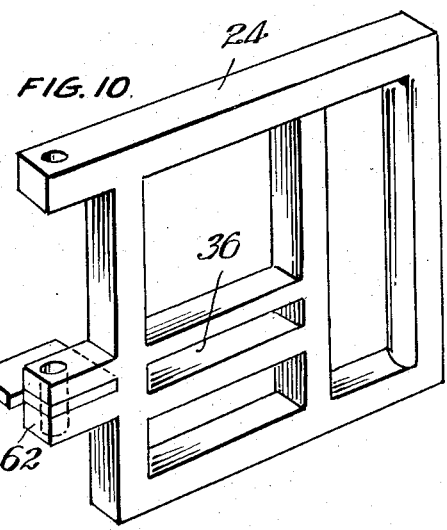
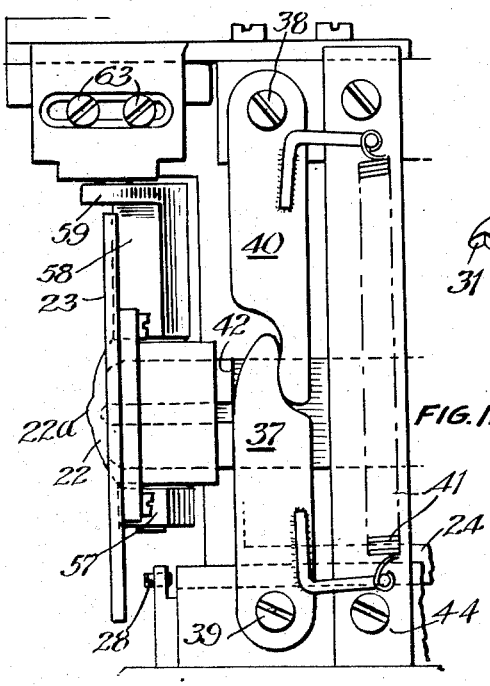
INVENTOR.
EARL R. ANDERSON
BY Harper Allen
ATTORNEY.

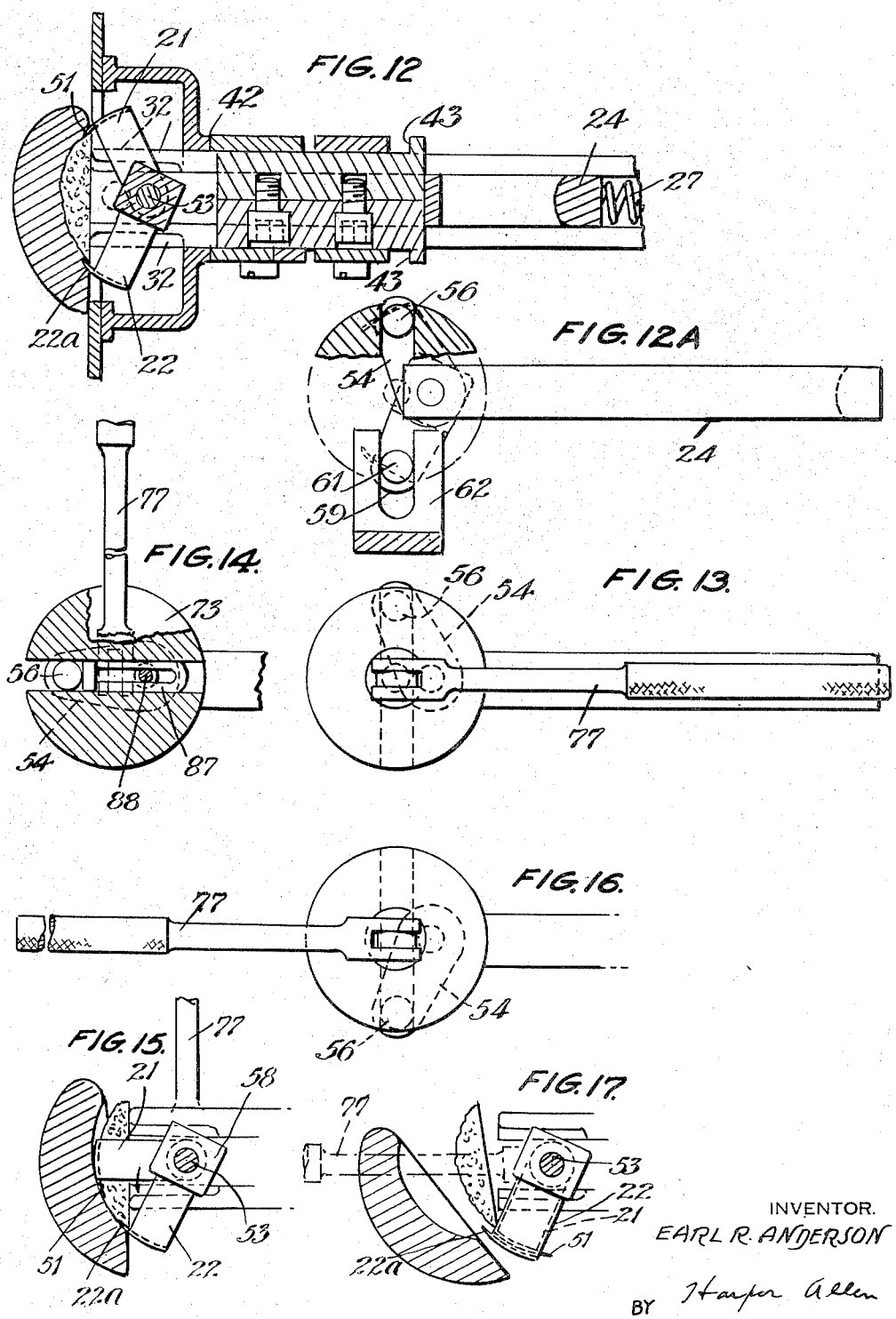

United States Patent Office 2,775,278
Patented Dec. 25, 1956

2,775,278

PEACH PITTER

Earl R. Anderson, Campbell, Calif., assignor to Filper Corporation, Richmond, Calif.

Application September 1, 1951, Serial No. 244,795

8 Claims. (Cl. 146—28)

The present invention relates to the pitting of peaches and is concerned more particularly with peach pitting mechanism of the type which holds the pit itself while performing the pitting operation.

It is the general object of the invention to provide improved pitting mechanism of the above type.

Another object of the invention is to provide pitting mechanism of the above character in which the peach is located with respect to the pitting knife by surface means engaging the flesh of the half fruit and the half pit, and by means of a pit locator which engages the pit at the stem cavity of the peach half.

Another object of the invention is to provide pitting mechanism of the above character in which one of the pit grasping elements is the pitting knife itself.

Another object of the invention is to provide pitting mechanism including a simplified and improved drive for the pitting knife or knives, in which the drive element invariably turns a given number of degrees irrespective of travel of the pitting knife through a greater or lesser extent, depending upon the size of the peach.

Other objects and advantages will be apparent from the following description of a preferred embodiment of the invention, as illustrated in the accompanying drawings, in which:

Figure 1 is a front elevational view of a hand operated pitter embodying the invention.

Figure 2 is a side elevational view of the pitter with certain parts broken away.

Figure 3 is a plan view of the pitter.

Figure 4 is a sectional plan view taken as indicated by the line 4—4 in Figure 2.

Figure 5 is a fragmentary sectional plan view taken as indicated by the line 5—5 in Figure 1.

Figure 6 is a sectional plan view taken as indicated on line 6—6 in Figure 2.

Figure 7 is a transverse sectional view taken as indicated with the line 7—7 in Figure 3.

Figure 8 is a detail perspective view of the pitting knife.

Figure 9 is a detail perspective view of the pit holding blade which cooperates with the pitting knife.

Figure 10 is a perspective view of the slide frame of the pitter.

Figure 11 is a fragmentary view similar to Figure 2 showing the parts as positioned by pressing a peach half against the peach positioning surface means 23—32.

Figure 12 is a schematic operational view similar to Figure 6 by showing the knife and the opposed holding blade actually engaged with a pit of a peach half at the very beginning of the pitting operation.

Figure 12A is a horizontal sectional view somewhat similar to Figure 5 showing the parts as positioned in Figure 11.

Figure 13 is a view similar to Figure 4 showing the parts positioned as in Figure 11.

Figure 14 is a view similar to Figure 5 showing the parts as positioned after 90 degrees of turn of the operating handle, i. e., midway through the pitting stroke.

Figure 15 illustrates the position of the pitting knife at the midpoint of the pitting stroke.

Figure 16 is a view similar to Figure 13 but showing the position of the parts at the end of the pitting stroke.

Figure 17 is a view similar to Figure 15 but showing the parts at the end of a pitting stroke.

In general, the pitter comprises a pitting head which includes a pitting knife 21 (Figures 1, 7 and 8) which cooperates with an opposed peach pit holding blade or member 22, both of which are referred to in greater detail hereinafter. The knife 21 and the blade 22 are positioned within a peach actuated positioning plate or ring 23 which is mounted for limited sliding movement on the slide frame 24, which is slidably mounted in the main frame 26 and is spring-urged forward by a spring 27 against an adjustable screw stop 28 (Figure 2). Within the knife 21, a peach or pit locator finger 31 is mounted on the end of the slide frame 24 (Figures 1 and 10). Adjacent the pit locator finger 31 are four pit-engaging surfaces 32 (Figure 1), lying in a plane and presented to a half pit as seen for example in Figures 6 and 11. The two pairs of positioning surfaces 32 are formed integrally, respectively, with the two halves of the support member for the annular plate 23, and lie in the same vertical plane to form therewith surface means for positioning a peach half. These halves of the plate 23 are connected by respective studs 34 slidably in a horizontal central slot 36 of the slide frame 24 so that the plate 23 and the abutment surface 32 move as a unit with respect to the slide frame 24. This peach half positioning unit is spring-urged to its forward position by respective toggle arms 37 and 40 (Figure 2) pivoted respectively on the frame at 38 and 39 and urged to the position shown in Figure 2 by a tension spring 41, which serves to engage arm 37 with a shoulder 42 of the unit. The forward position of the unit is controlled by shoulders 43 engaging similar vertical straps 44 (Figures 2 and 3), and the rearward position by a shoulder 42 engaging an adjustably mounted strap 46 (Figure 3) having a horizontal slot 47 engaged by a fastening stud 48, and being similarly mounted at its lower end.

The knife 21 (Figures 1, 6 and 8) is semi-circular in shape and is provided with a sharpened cutting edge along its entire extent. At the central portion of the knife a sharpened holding finger or projection 51 is provided for engaging over the pit as shown, for example in Figure 11. The respective ends of the knife 21 are provided with respective aligned bosses 52 by means of which it is secured to a drive shaft 53 having a crank arm 54 at its upper end carrying a pin 56, referred to in greater detail hereinafter. The holding and shear blade 22 (Figures 1, 7 and 9) is provided at one end with a boss 57 and the other end is secured to a sleeve 58 having crank arm 59 at its upper end carrying a pivot pin 61. The shaft 53 for the knife extends through the sleeve 58, which is pivoted thereon. The shaft 53 also extends through a front split projection 62 (Figures 1, 7 and 10) of the slide frame in which the pit locator 31 is mounted. Thus the knife 21 and the blade 22 form together a toggle linkage whose pivoted connection is also pivoted in the slide frame 24 so that a floating mounting of the knife and the blade is provided.

The floating and relative pivotal adjustment of the knife 21 and the blade 22 is controlled through the crank arm 59, as seen in particular in Figures 1, 4 and 12A. A pin 61 on the arm 59 engages a transverse slot 60 in a bracket 62 adjustably secured by screws 63 on a frame piece 64, secured to the top of the frame 26 by means of screws 66 (Figure 2). By adjustment of the bracket 62, the angular adjustment of the holding blade 22 can be set as desired.

A drive unit is provided for the knife having the same stroke or travel, in this case 180 degrees, for each operation but which serves to impart to the knife a variable stroke depending upon the size of the peach half presented to the pitter. As seen in Figures 4 and 7, the frame piece or plate 64 is centrally apertured to receive a disk element 71 having respective upper and lower disk elements 72 and 73 disposed above and below the plate 64, respectively, and being secured together by screws 74. The upper disk 72 carries a central hub 76 for a socket wrench 77 forming the driver. The stroke of movement is controlled by an adjustable stop piece 81 (Figure 3) on the disk 72 between respective stops 82 and 83 on the frame piece 64. By adjusting slide 81 relative to stop 83, the initial position of knife 21 is set to correspond to the adjustment of blade 22 by bracket 62. The lower disk 73 (Figures 5 and 7) has a diametral slot 86 with which the pin 56 on the crank arm 54 is engaged. An adjustable slot end is provided by means of a lug 87 adjustably mounted in the slot 86 by a screw 88.

With reference to Figures 3 and 4, it will be noted that the drive unit has an axis of oscillation or rotation which is coincident with the axis of the shaft 53 in the forward position of the slide frame 24 and the peach positioning means 23. However, when the positioning unit 27—32 is moved rearwardly so that the knife 21 and the blade 22 grip a pit by means of their central extensions 51 and 22a respectively, the center of rotation of the knife is displaced rearwardly with respect to the center of rotation of the drive unit. This difference in adjustment is accommodated by radial sliding movement of the pin 56 in the slot 86. This difference of position of the pin 56 in the slot 86 is illustrated in Figures 11 and 12. With the parts positioned as shown in Figures 11 and 12, i. e., with the peach pit grasped firmly by the blades 21 and 22, turning of the hand crank for 180 degrees completes the pitting operation.

Preferably, the machine is provided with means for releasing the tight grasp of the peach pit after the pitting operation is started, so that a floating flexible movement of the pitting knife as it travels around the pit is possible. This is accompanied by positioning the stop 87 (Figures 5 and 7) so that toward the middle of a stroke the pin 56 moving in the slot 86 engages the stop 87 and further turning causes movement of the slide frame 24 toward the front of the machine, so that pivot shaft 53 for the pitting knife and the holding blade moves forward to open the blades slightly. It will be noted that at this time the pitting knife 21 (Figure 15) is engaged over the peach pit and is driving toward the holding blade 22, so that the grasp on the peach pit is maintained, but a certain flexibility in the relation of the knife, the peach support and the holding blade is provided. It will be noted that in this operation the holding blade 22 in effect acts as a shear blade for the peach.

Figures 16 and 17 illustrate the parts at the end of the turn when the flesh of the fruit has been severed from the pit. It will be noted that while the handle 77 has been turned a full 180 degrees, the pitting knife has traveled a lesser extent depending upon the size of the peach pit, i. e., the amount of travel of the pitting knife 21 and the holding blade 22 to engage the pit as shown in Figure 11.

In operation of the pitter, a peach half is presented, either manually or by means of a suitable holder, with the cut face against the outer peach engaging surface 23 and the inner peach engaging surface comprising the four sections 32 with stem-blossom axis positioned horizontally and the stem end adjacent the pit locator 31. The peach is positively located with respect to the pitting head by engagement of the pit locator 31 with the pit in the stem cavity. Pressure is applied through the peach to the pitting head to retract the pitting head for the full extent of the movement of the pitting head. This rearward movement of the pitting head is, of course, accompanied by rearward movement of the slide frame 24, and also rearward movement of the drive shaft 53 for the pitting knife, so that the point of pivotal connection of the toggle connection between the pitting knife 21 and the holding blade 22 is moved rearwardly, and knife 21 and blade 22 move together slightly and also outwardly into the flesh of the fruit into position so that the projections 51 and 22a, which enter the flesh, overlap the pit. After the pitting head reaches the limit of its rearward movement, the slide frame 24 is grasped and moved further toward the rear until projection 51 of the pitting knife 21 and projection 22a of the holding blade 22 are firmly engaged with the pit of the fruit. The extent of this movement is determined by the size of the pit. At this time the pressure on the peach half can be released if desired, although this is not necessary.

It is to be noted that effective movement of the knife 21 and the blade 22 is substantially linear during these operations, because as they pivot their axis of pivotal movement is receding. Also, their effective projection into the fruit is caused by travel of the fruit with the support plate 23.

Subsequently, the operating handle 77 is turned through 180 degrees to effect movement of the pitting knife over the pit of the fruit, the shearing blade 22 being maintained in position and acting as a line of shear for the flesh of the fruit, the pitting knife 21 passing inside of the holding blade 22 (Figure 17). During this pitting movement of the pitting blade and near the middle of the cycle, the pin 56 (Figure 14) engages the adjustable stop 87 at the bottom of the slot 86, so that the slide frame 24 carrying the pivotal axis connecting the pit knife and the blade is cammed outwardly, and the firm grasp on the peach pit is relieved. However, at this time, the pitting knife 21 has passed partially over the peach pit and is driving toward the holding blade 22, so that the peach half is still held firmly in position during the remainder of the pitting operation. The effect of this control is to loosen the knife 21 and blade 22 relative to the peach pit and giving a flexible floating action of the knife during the remainder of the pitting operation. The extent of the loosening desired, and the turning, are controlled by the adjustment of the stop or cam slide 87 in the slot 86.

At the end of the movement of the pitting knife, the peach half (Figure 17) is severed from the pit.

While I have shown and described a preferred modification of the invention, it can be embodied in other forms, so that its scope should be limited only by the appended claims.

I claim:

1. In a peach pitter, a pitting head comprising a member having surface means for engagement by the half pit of a peach half, yieldable means mounting said member for receding movement upon engagement of a peach half therewith, peach supporting means comprising opposed pit grasping elements, means providing a common floating pivotal mounting for said grasping elements, one of said elements comprising a pitting knife, and a locating finger for engaging the end of the pit at the stem cavity and positioned inside of said pitting knife.

2. In a peach pitter, a pitting head comprising a member having surface means for engagement by the half pit of a peach half, peach supporting means comprising opposed pit grasping elements, means providing a common floating pivotal mounting for said grasping elements, one of said elements comprising a pitting knife, and operating means for said knife to effect pitting movement thereof including a driving element having an invariable extent of travel and a driven element having a variable extent of travel controlled by said grasping elements in accordance with the size of the half pit.

3. In a peach pitter, a pitting head cormprising surface means for engagement by the cut portion of a pit half, a peach locator for locating the half pit of a peach half with respect to said surface means, means adjacent said surface means for grasping the half pit of a peach half on said surface means comprising opposed members for grasping the respective ends of a half pit and having a common floating pivotal connection, and respective crank arms connected to said members and having respective sliding pivotal connections with associated support means to control movement of said members in engaging a peach pit.

4. Peach pitter as claimed in claim 3 in which one of the members is a pitting knife and its associated crank arm comprises a driven element.

5. A peach pitter comprising peach engaging means, a pitting knife movably mounted relative to said engaging means, means for moving said knife relative to said engaging means to engage the pit of a peach thereon, and means for thereafter effecting pitting movement of said knife including means operable during said pitting movement to move said knife and said engaging means to loosen engagement of said knife and said surface means with said pit to provide a floating engagement of the knife with the pit during the remainder of the cutting stroke of the knife.

6. In a peach pitter, a pitting head comprising a surface providing a center abutment to engage the pit of a peach half, a pair of blades disposed about said abutment, means providing a mounting for said blades to provide for movement of one of said blades over said pit into overlapping relation with said abutment with said pit between said abutment and said one blade, means for effecting a preliminary movement of said blades into engagement with a peach pit engaged with said abutment at points adjacent to opposite edges of said pit to confine the peach pit with respect to the abutment, said one blade of said pair being arcuate and being mounted for said movement with respect to the pit to said overlapping relation with said abutment after said preliminary movement thereof while maintaining the pit confining relation of the blades and the abutment with said other blade of said pair stationary and in its said engagement with said pit adjacent to one of the edges of said pit.

7. In a peach pitter, a pitting head comprising peach supporting means, a pitting knife, operating means for said knife to effect pitting movement thereof including a driving element having an invariable arcuate extent of travel and a driven element having a variable arcuate extent of travel, and means for controlling the arcuate extent of travel of said driven element, said driving element comprising a disk having a diametral slot and the driven element comprising a crank arm having a pin engaging said diametral slot, said driven element having floating mounting providing for offset of its aixs of rotation with respect to the axis of said driving element.

8. In a peach pitter, a pitting head comprising a member having surface means for engagement by the half pit of a peach half, yieldable means mounting said member for a limited receding movement upon engagement of a peach half therewith, and peach supporting means comprising opposed pit grasping elements, means providing a common floating pivotal mounting for said grasping elements, one of said elements comprising a pitting knife, and means operable during said pitting movement to move said knife and said surface means to loosen engagement of said knife and said surface means with said pit to provide a floating engagement of the knife with the pit during the remainder of the cutting stroke of the knife.

References Cited in the file of this patent

UNITED STATES PATENTS

| Number | Name | Date |
| --- | --- | --- |
| 1,512,410 | Eldridge | Oct. 21, 1924 |
| 1,532,458 | Whipple | Apr. 7, 1925 |
| 2,061,051 | Thompson | Nov. 17, 1936 |
| 2,277,711 | Nauman | Mar. 31, 1942 |
| 2,302,688 | Ewald | Nov. 24, 1942 |
| 2,329,212 | Nawman | Sept. 14, 1943 |
| 2,376,526 | Thompson | May 22, 1945 |
| 2,443,863 | Lindley | June 22, 1948 |
| 2,581,785 | De Back et al. | Jan. 8, 1952 |
| 2,605,796 | Waters | Aug. 5, 1952 |
| 2,623,564 | Ewald et al. | Dec. 30, 1952 |
| 2,652,872 | Kessling | Sept. 22, 1953 |